April 25, 1933.   B. BRONSON   1,905,895
RUNNING BOARD
Filed March 26, 1930
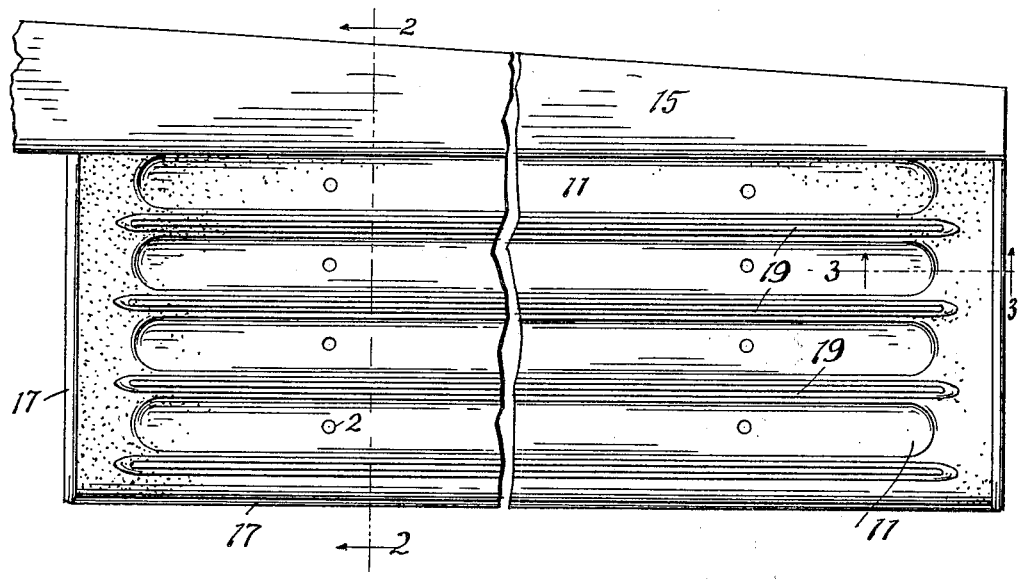
Fig. 1.
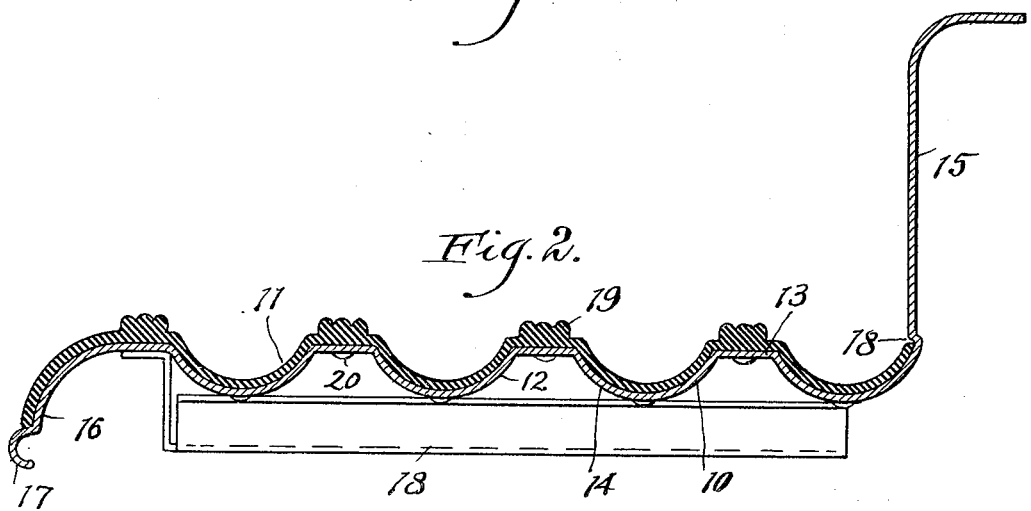
Fig. 2.
Fig. 3.
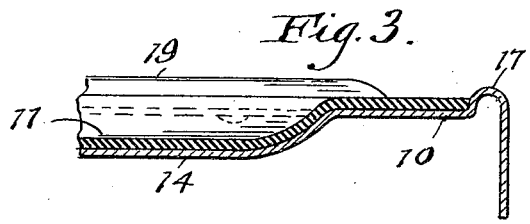
Inventor:
Budd Bronson
Knox Hudson & Kent
attys.

Patented Apr. 25, 1933

1,905,895

UNITED STATES PATENT OFFICE

BUDD BRONSON, OF CLEVELAND, OHIO, ASSIGNOR TO THE OHIO RUBBER COMPANY, OF CLEVELAND, OHIO, A CORPORATION OF OHIO

RUNNING BOARD

Application filed March 26, 1930. Serial No. 438,957.

This invention relates to vehicle running boards and more particularly to an improved form of running board of composite steel and rubber construction.

An object of this invention is to provide a vehicle running board having a metal body provided with an extension adapted to form a splash pan.

Another object of this invention is to provide a durable and attractive rubber covered running board.

Other objects and advantages of this invention will be apparent from the following description taken in conjunction with the accompanying sheet of drawing, in which:

Fig. 1 is a top plan view of a running board constructed according to my invention;

Fig. 2 is a transverse sectional elevation taken on line 2—2 of Fig. 1; and

Fig. 3 is a fragmentary sectional elevation taken on line 3—3 of Fig. 1.

In the drawing, I have illustrated one form of composite steel and rubber vehicle running board embodying my invention, but it should be understood, however, that my invention may also be embodied in running boards of various forms and shapes. The running board, which I have shown for the purpose of illustrating my invention, comprises a metallic body 10 and a rubber covering 11 molded and vulcanized to the surface of the metal body. The metal body is preferably formed as a sheet metal stamping having a substantially horizontally extending top portion 12 which is formed with alternate relatively elevated and depressed portions 13 and 14 or, in other words, is of corrugated cross-section. These corrugations materially strengthen the metal body and also give it a desired, attractive appearance. Along the side of the metal body which is toward the vehicle structure when the running board is assembled in place, an integral portion of the metal of the body is extended to provide the elongated flange 15 forming a splash pan which extends upwardly and inwardly over a portion of the vehicle structure. At the opposite side, or along the edge which is away from the vehicle structure, the metal body is curved or bent downwardly to provide the longitudinally extending depending flange 16. Along the lower edge of this flange, the metal is bent to form the rounded bead 17 which extends outwardly beyond the upper rounded portion of the depending flange. Suitable cross members 18 may be provided on the under side of the metal body for supporting the running board upon suitable brackets carried by the vehicle structure. These cross-members may be of any suitable shape and are attached to the metal body in any convenient manner, as by welding their end portions thereto.

The rubber covering 11 is attached to the surface of the metal body by being molded and vulcanized in contact with the surface of the metal. The rubber covering follows the contour of the corrugations, and at the outer edge of the metal body, the covering is carried down upon the depending flange 16. Along the ends and outer edge of the metal body the edges of the rubber covering engage the rounded bead 17 which protects these edge portions of the covering and prevents their being torn loose from the metal. Along the inner side of the metal body, the edge of the rubber covering 11 engages the longitudinally extending shoulder 18 formed at the junction between the top portion of the metal body and the upwardly extending flange 15. This longitudinally extending shoulder 18 protects the edge of the rubber covering and prevents it from being torn loose from the metal.

The portions of the rubber covering which are secured to the depressed portions of the metal body are preferably of uniform thickness while the portions of the covering which are secured to the elevated portions of the metal body are preferably thickened to provide the longitudinally extending ribs 19 along the tops of the elevated portions. The additional thickness of the ribs 19 takes care of the increased wear to which the elevated portions of the running board are subjected. To assist in securing the rubber covering to the metal, spaced rubber rivets 20 may be formed integral with the ribs 19 so as to extend through the metal body. If desired, perforations 21 may be provided through the depressed portions, and through the rubber covering secured thereto, to permit drainage of water accumulating in the depressions.

It will now be readily seen that I have provided a rubber covered running board which is of very durable form and which is attractive in appearance. By providing the running board body with an integral extension adapted to form a splash pan, I have eliminated the need for the use of screws or bolts for attaching the inner edge of the running board to the vehicle structure. This form of construction presents a neater appearance, reduces the number of parts, and simplifies the assembling operation.

While I have shown and described the device of my invention in a detailed manner, it should be understood, however, that I do not intend to limit myself to the precise details of construction shown and described but regard my invention as including such changes and modifications as do not involve a departure from the spirit of the invention and the scope of the appended claims.

Having thus described my invention, I claim:

1. A running board comprising a metal body having alternate elevated and depressed portions, and a covering of rubber vulcanized and attached to said body so as to follow the contour of said elevated and depressed portions, said covering having thickened portions extending above the elevated portions of the body, and spaced rubber rivets formed integral with said thickened portions and extending through openings in said elevated portions.

2. A vehicle running board comprising a sheet metal body having a depending flange along the outer edge thereof and a flange along the inner edge thereof extending upwardly over a portion of the vehicle structure, said depending flange having a lower portion extending outwardly beyond the upper portion thereof and said upwardly extending flange having a shoulder along its lower edge, and a rubber covering vulcanized to said body with one edge thereof engaging said shoulder and another edge thereof engaging the outwardly extending portion of said depending flange.

3. A vehicle running board comprising a corrugated sheet metal body having a depending flange along the outer edge thereof and a flange along the inner edge thereof extending upwardly over a portion of the vehicle structure, said depending flange having a lower portion extending outwardly beyond the upper portion thereof and said upwardly extending flange having a shoulder along its lower edge, and a rubber covering vulcanized to said body so as to follow the contour of the corrugations and with one edge thereof engaging said shoulder and another edge thereof engaging the outwardly extending portion of said depending flange.

4. A running board comprising a sheet metal body having a plurality of longitudinally extending depressions therein and also having substantially flat areas at the ends of said depressions and extending longitudinally between the latter, and a covering of rubber substantially uniformly attached to the flat and depressed portions of said body, said covering having integral thickened portions substantially coextensive with the longitudinally extending flat areas of the metal body.

In testimony whereof, I hereunto affix my signature.

BUDD BRONSON.